US008403520B2

(12) United States Patent
Liao et al.

(10) Patent No.: US 8,403,520 B2
(45) Date of Patent: Mar. 26, 2013

(54) FIRE NOZZLE QUICK-ASSEMBLY LIGHT

(75) Inventors: Jung-Huang Liao, Hsinchu County (TW); Tzeng-Wuu Wey, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 13/083,077

(22) Filed: Apr. 8, 2011

(65) Prior Publication Data

US 2012/0120630 A1 May 17, 2012

Related U.S. Application Data

(60) Provisional application No. 61/413,765, filed on Nov. 15, 2010.

(30) Foreign Application Priority Data

Jan. 25, 2011 (TW) ............................ 100102588 A

(51) Int. Cl.
*B60Q 1/00* (2006.01)

(52) U.S. Cl. ..................... 362/192; 362/96; 362/249.02; 290/43

(58) Field of Classification Search .................... 362/84, 362/96, 101, 183, 192, 193, 209, 236, 240, 362/249.01, 249.02, 176, 800; 290/43, 54
See application file for complete search history.

(56) References Cited

U.S. PATENT DOCUMENTS

| | | | | | |
|---|---|---|---|---|---|
| 4,731,545 | A | * | 3/1988 | Lerner et al. | 290/54 |
| 5,793,130 | A | * | 8/1998 | Anderson | 310/50 |
| 5,795,053 | A | * | 8/1998 | Pierce | 362/96 |
| 6,036,333 | A | * | 3/2000 | Spiller | 362/192 |
| 6,116,520 | A | * | 9/2000 | Lee | 239/289 |
| 6,768,218 | B2 | * | 7/2004 | Yumita | 290/54 |
| 6,876,100 | B2 | * | 4/2005 | Yumita | 290/54 |
| 7,233,078 | B2 | * | 6/2007 | Baarman et al. | 290/43 |
| 7,823,801 | B2 | * | 11/2010 | McGarry et al. | 239/18 |

FOREIGN PATENT DOCUMENTS

| | | |
|---|---|---|
| TW | M263587 | 5/2005 |
| TW | M336786 | 7/2008 |
| TW | M350064 | 2/2009 |
| TW | 201003003 | 1/2010 |

* cited by examiner

*Primary Examiner* — Hargobind S Sawhney
(74) *Attorney, Agent, or Firm* — WPAT PC; Justin King

(57) ABSTRACT

A fire nozzle quick-assembly light is provided, which comprises a frame, a luminous device and an electricity generation device. The luminous device and the electricity generation device are sited to the frame. The luminous device is for illuminating in the fire scene, and the electricity generation device is for providing electricity to the luminous device. The fire nozzle quick-assembly light could depend on fireman's needed to be assembled or removed from the fire equipment quickly and provide high illumination to help extinguish fire, evacuate and lower the possibility that fireman suffers injury in dark environment. When the fire accident happens in the place with sufficient light, fireman does not need the additional illumination at this time. The fire nozzle quick-assembly light could be removed from the fire equipment easily to lower the weight.

11 Claims, 10 Drawing Sheets

FIRE NOZZLE QUICK-ASSEMBLY LIGHT

TECHNICAL FIELD

The present disclosure relates to an luminous device, and more particularly, to a fire nozzle quick-assembly light that is used for lighting a fire scene so as to assist firemen in putting out blaze, hooking up hoses, evaluating fire scenes, etc. while capable of being detached from any firefighting equipment easily and rapidly for releasing the burden of firemen when there is no need for additional illumination.

TECHNICAL BACKGROUND

Generally, it is common for firemen to work in pitch-black conditions as in most fire scene, the first thing to do is to cut off the electricity in the building that is on fire. Thus, in order to function adequately in such poorly illuminated environment, firemen usually have to depend upon the light emitting from the flashlight mounted on their helmets. However, since the total equipment that a fully-equipped fireman had to bear can weight more than 20 kilograms, it is impossible or unbearable for a fireman to attach a heavy and cumbersome high-power flashlight on his/her helmet. Not to mention that a fireman operating a fire nozzle for fighting fire will have to hand on the fire nozzle with both hands since the high water pressure inside the fire hose causes it to be very heavy, stiff and thus difficult to control, and thus, he/she will have no spare hand or strength to hold on to and operate a heavy high-power flashlight for either illuminating the fire scene or fire fighting command.

There are already many studies for overcoming the aforesaid problem. One of which is an adjustable fluid-driving illumination device, disclosed in TW Pat. Pub. No. 201002978, in which a turbine generator is fixedly fitted inside a fire nozzle for allowing the same to be driven by the water flowing inside the fire nozzle and thus generate power to an illumination device. However, as the fitting of the turbine generator inside the fire nozzle will certainly cause some loss to the water pressure and water flow of the fire nozzle, and also since water source is as importance as the light source for assisting a fireman in firefighting operations, any loss to the water pressure and flow can adversely affect the ability of firemen for fighting fire. Therefore, in the aforesaid disclosure, an adjustable turbine generator is adopted, by that in a condition when high-brightness illumination is not required, such as when fighting a fire outdoors during day time, the turbine generator can be moved to nozzle handle for preventing the blades inside the turbine generator from being impacted and flushed by the fluid flowing through the fire nozzle, and thus, preventing any loss to the water pressure and flow to be caused by the blocking of the turbine generator. Nevertheless, although the problem of the lost in water pressure and flow is solved, the weight from the turbine generator inside the fire nozzle will be an additional burden all the time to the fireman holding the fire nozzle for fight fire no matter it is being activated for powering the illumination device or not.

Therefore, it is in need of a fire nozzle quick-assembly light capable of lighting a fire scene to assist firemen in putting out blaze, hooking up hoses, evaluating fire scenes, etc. while capable of being detached from the fire nozzle easily and rapidly depending on his/her physical condition or when illumination to the fire scene is not required.

TECHNICAL SUMMARY

The present disclosure relates to a fire nozzle quick-assembly light capable of providing high-brightness lighting to a fire scene for assisting firemen in putting out blaze, hooking up hoses, evaluating fire scenes, etc. while capable of being mounted on or detached from any firefighting equipment easily and rapidly depending on the evaluation of the firemen.

In an embodiment, the present disclosure provides a fire nozzle quick-assembly light, adapted for connected to a fire nozzle and a fire hose, which comprises: a frame, configured with a via hole, a first end and a second end in a manner that the first and the second ends are disposed on the frame at positions opposite to each other for connecting respectively to the first nozzle and the first hose, while allowing the via hole to be formed boring through the frame from the first end to the second end; a luminous device, disposed on the frame; and an electricity generation device, disposed on the frame and for providing power to the luminous device.

In another embodiment, the present disclosure provides a fire nozzle quick-assembly light, adapted for mounting on a fire nozzle, which comprises: a frame, formed with a groove for mounting the frame onto the fire nozzle by clamping; a luminous device, disposed on the frame; and an electricity storage device, disposed on the frame and for providing power to the luminous device.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DESCRIPTION OF THE EXEMPLARY EMBODIMENTS

For your esteemed members of reviewing committee to further understand and recognize the fulfilled functions and structural characteristics of the disclosure, several exemplary embodiments cooperating with detailed description are presented as the follows.

Figure 1A:
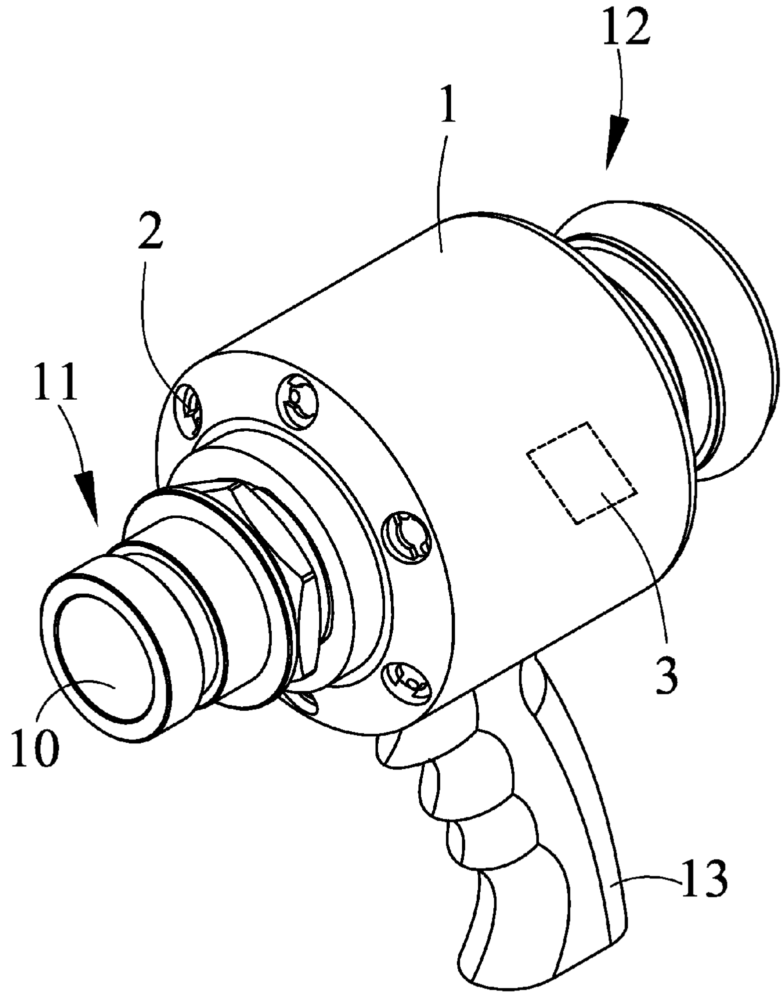
FIG. 1A is a schematic diagram showing a fire nozzle quick-assembly light with handle of the present disclosure.
Figure 1B:
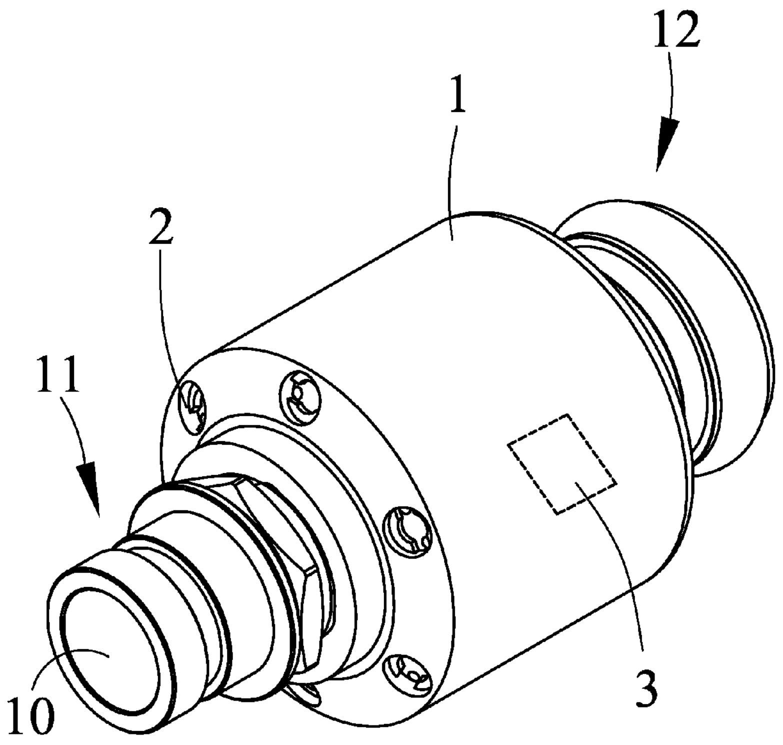
FIG. 1B is a schematic diagram showing a fire nozzle quick-assembly light without handle of the present disclosure.

Please refer to FIG. 1A and FIG. 1B, which are schematic diagrams showing a fire nozzle quick-assembly light with handle and a fire nozzle quick-assembly light without handle according to the present disclosure. In FIG. 1B, a fire nozzle quick-assembly light adapted for connected to a fire nozzle 0 and a fire hose 00 is disclosed, which comprises: a frame 1, configured with a via hole 10, a first end 11 and a second end 12 in a manner that the first and the second ends 11, 12 are disposed on the frame 10 at positions opposite to each other for connecting respectively to the first nozzle 0 and the first hose 00, while allowing the via hole 10 to be formed boring through the frame 1 from the first end 11 to the second end 12; a luminous device 2, disposed on the frame 1; and an electricity generation device 3, disposed on the frame 1 and for providing power to the luminous device 2. In this embodiment, each of the first end and the second end 11, 12 can be formed into a rapid joint or a screw joint, but is not limited thereby. Moreover, the fire nozzle quick-assembly light shown in FIG. 1A is further configured with a handle 13.

Figure 2:
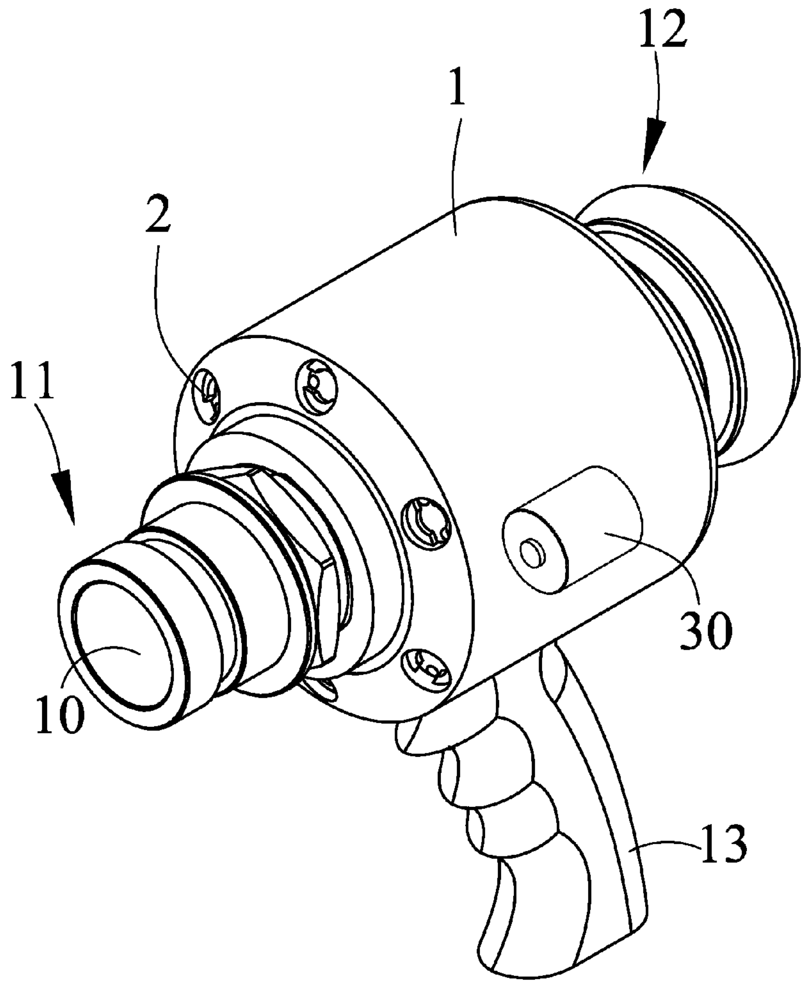
FIG. 2 is a three-dimensional view of a fire nozzle quick-assembly light according to a first embodiment of the present disclosure.

Please refer to FIG. 2, which is a three-dimensional view of a fire nozzle quick-assembly light according to a first embodiment of the present disclosure. As shown in FIG. 2, the electricity generation device 3 further comprises an electricity storage device 30, and in this embodiment, the electricity storage device 30 can substantially be a battery pack used for providing power to the luminous device 2, but it is not limited thereby. As illustrated in this embodiment, the fire nozzle quick-assembly light can be detached from or connected to the fire nozzle 0 and the fire hose 00 without having any bad affection to the water flow in the fire nozzle 0 and the fire hose 00.

Figure 3A:
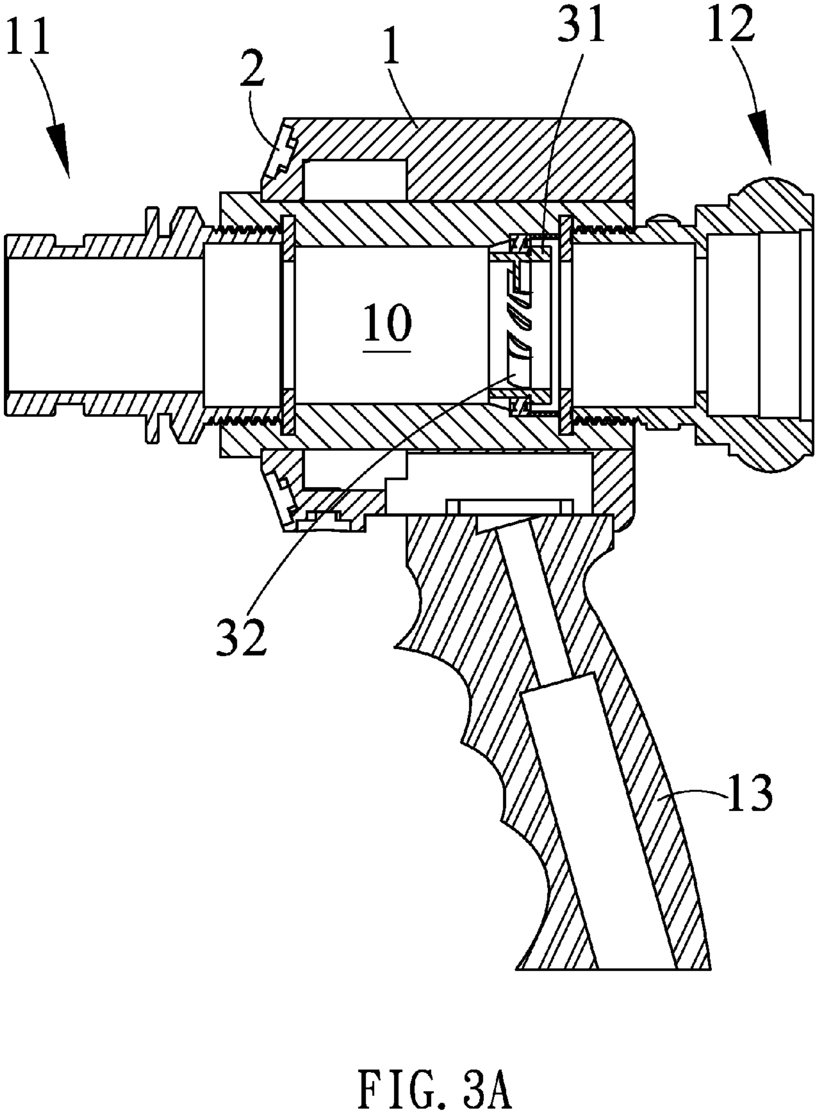
FIG. 3A is a cross sectional view of a fire nozzle quick-assembly light according to a second embodiment of the present disclosure.
Figure 3B:
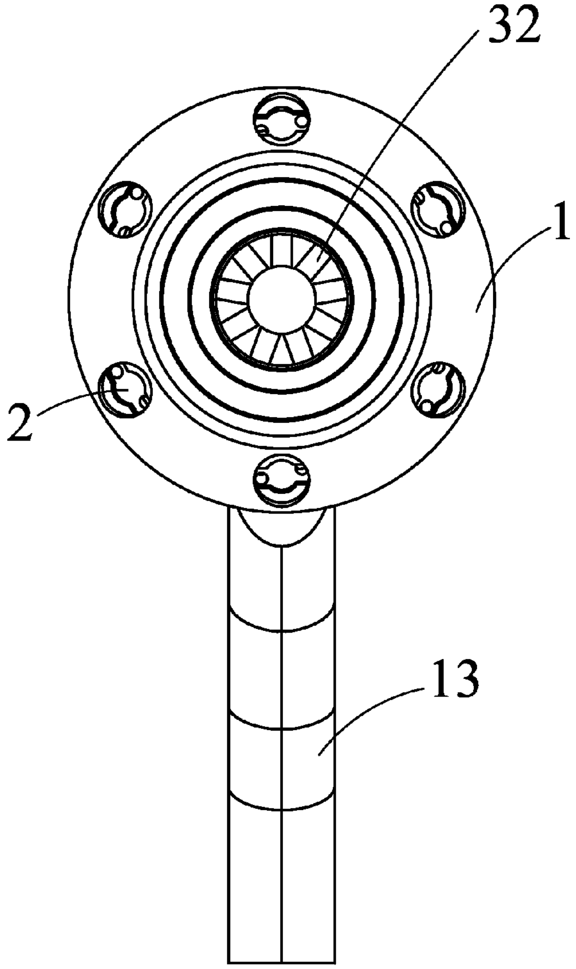
FIG. 3B is a front view of the fire nozzle quick-assembly light shown in the second embodiment of the present disclosure.
Figure 4A:
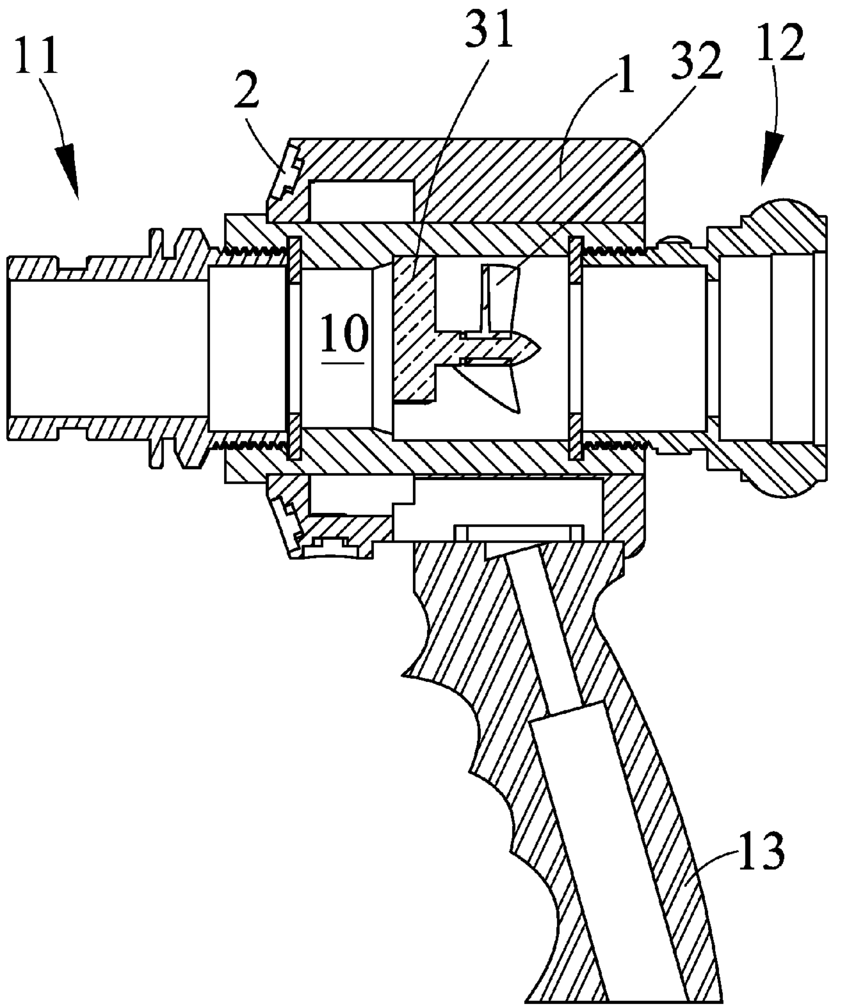
FIG. 4A is a cross sectional view of a fire nozzle quick-assembly light according to a third embodiment of the present disclosure.
Figure 4B:
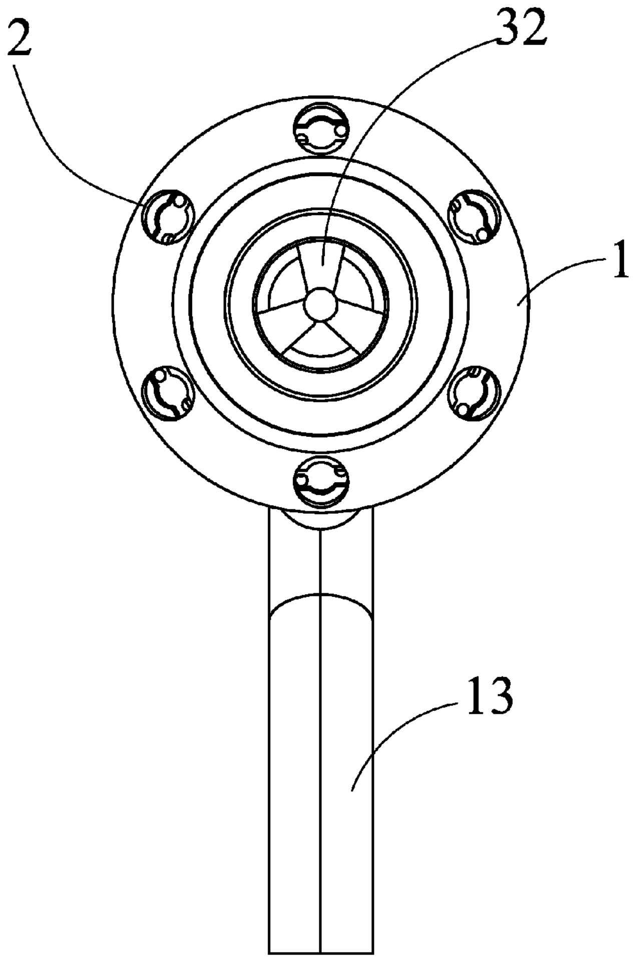
FIG. 4B is a front view of the fire nozzle quick-assembly light shown in the third embodiment of the present disclosure.

In addition, the electricity generation device 3 further comprises: a generator 31, which has a blade element 32 disposed inside the frame 1 at position for allowing a fluid flowing inside the frame 1 to flow therethrough when the fire nozzle quick-assembly light is connected to the fire nozzle 0 and the fire hose 00, and consequently, allowing the flow to flush upon the blade element 32 for driving the same to rotate and thus cause the generator 31 to produce electricity accordingly. It is noted that the generator is a device selected from the group consisting of: a solid-shaft generator and a hollow-shaft generator. Please refer to FIG. 3A and FIG. 3B, which are a cross sectional view and a front view of a fire nozzle quick-assembly light according to a second embodiment of the present disclosure. In this embodiment, the generator 31 is a hollow-shaft generator. Please refer to FIG. 4A and FIG. 4B, which are a cross sectional view and a front view of a fire nozzle quick-assembly light according to a third embodiment of the present disclosure. In this embodiment, the generator 31 is a solid-shaft generator. Both the solid-shaft generator and hollow-shaft generator are known to those skilled in the art, and thus will not be described further herein. Moreover, in these two embodiments, the luminous device used in the fire nozzle quick-assembly light is substantially a light-emitting diode (LED), or it can otherwise be a tungsten lamp or an incandescent lamp, but it is not limited thereby.

As the generator 31 of the fire nozzle quick-assembly light of the present disclosure is disposed inside the frame 1 thereof, the fluid flowing inside the frame 1 can flush directly upon the blade element 32 for driving the same to rotate and thus cause the generator 31 to produce electricity accordingly, by that the fire nozzle quick-assembly light can be powered by the fluid flowing inside the fire nozzle 0 and the fire hose 00 without the use of other power sources. In addition, by the design of the first end 11 and the second end 12, the fire nozzle quick-assembly light can be detached easily and rapidly at the instant when it is determined by the fireman after evaluating the current fire situation and personal physical condition, and thus enhancing the firefight ability of the fireman.

Figure 5A:
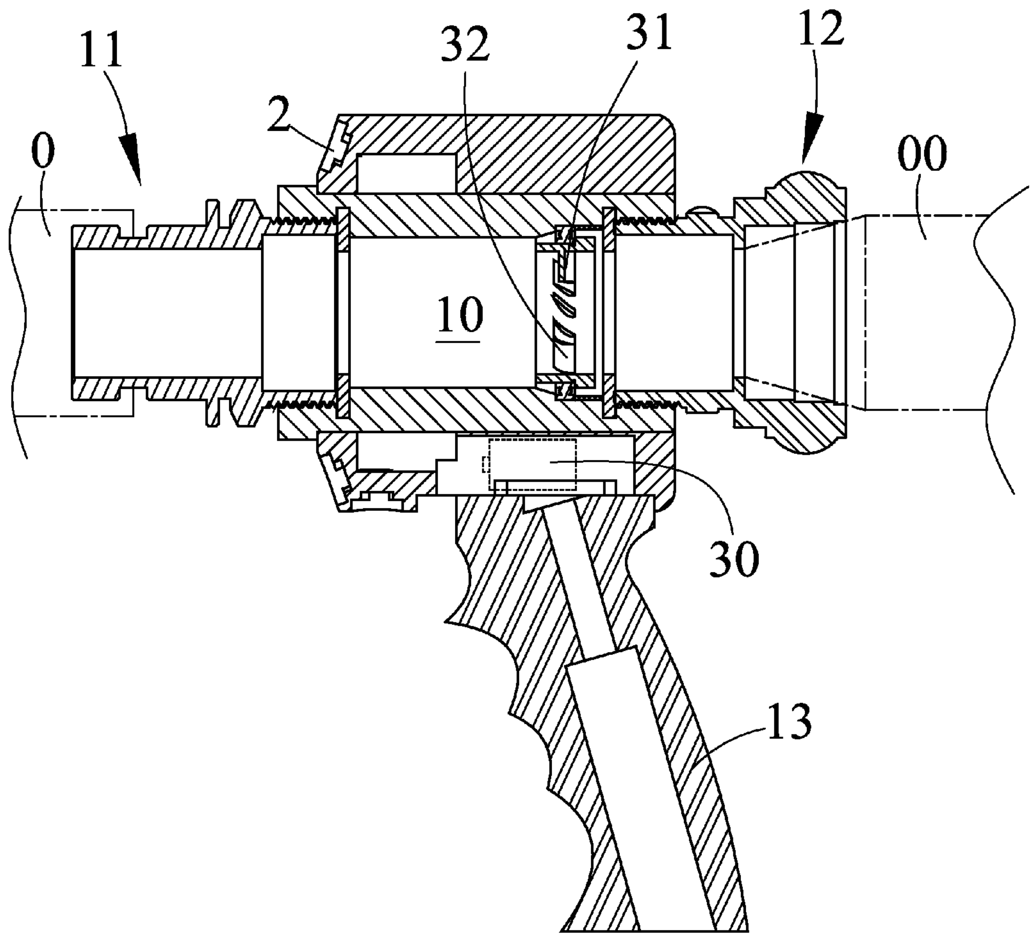
FIG. 5A is a cross sectional view of a fire nozzle quick-assembly light according to a fourth embodiment of the present disclosure.
Figure 5B:
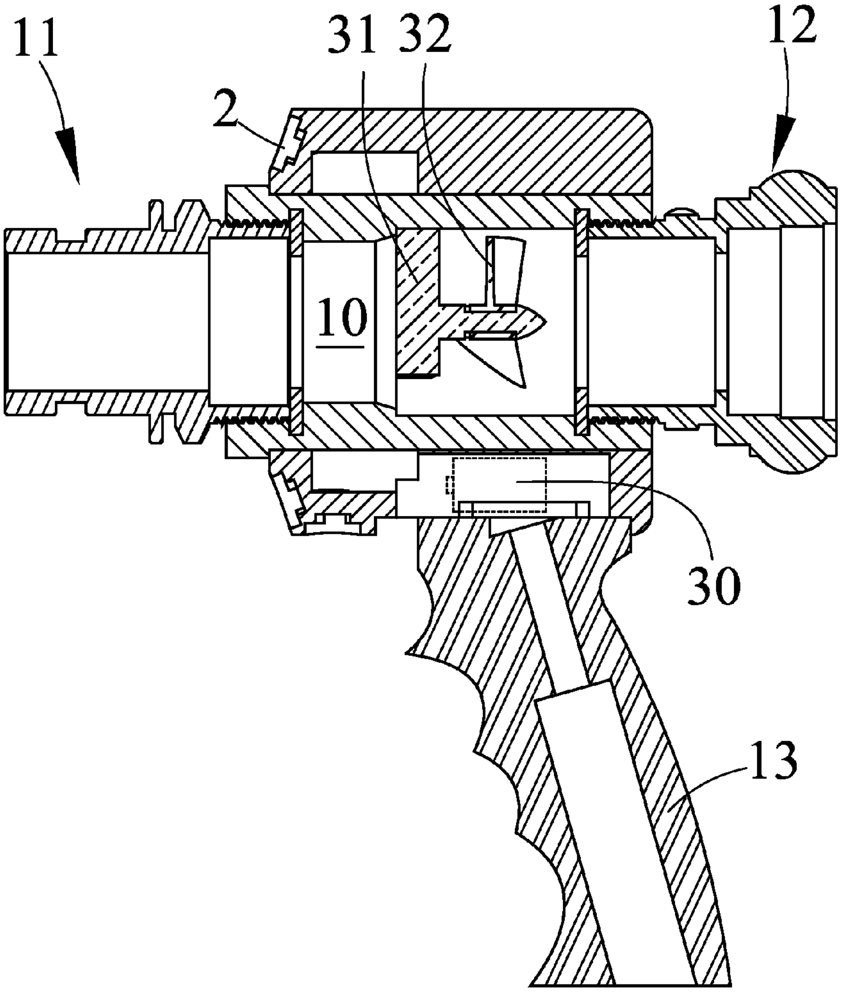
FIG. 5B is a cross sectional view of a fire nozzle quick-assembly light according to a fifth embodiment of the present disclosure.

It is noted that the electricity generation device 3 can be configured with the electricity storage device 30 and the generator 31 at the same time. Please refer to FIG. 5A and FIG. 5B, which are a cross sectional view of a fire nozzle quick-assembly light according to a fourth embodiment of the present disclosure, and a cross sectional view of a fire nozzle quick-assembly light according to a fifth embodiment of the present disclosure. In the embodiment shown in FIG. 5A, the electricity generation device 3 is configured with a battery pack and a hollow-shaft generator. In the embodiment shown in FIG. 5B, the electricity generation device 3 is configured with a battery pack and a solid-shaft generator. Operationally, in the condition when there is sufficient water flow for driving the blade element 32 to cause the generator 31 to produce sufficient power to the luminous device 2, the luminous device 2 will receive power only from the generator 31. However, when the water flow is not sufficient or the water pressure is low while there is still in need of high-brightness lighting, the fireman can simply activate the electricity storage device 30, i.e. the battery pack, for providing power to the luminous device 2.

Figure 6:
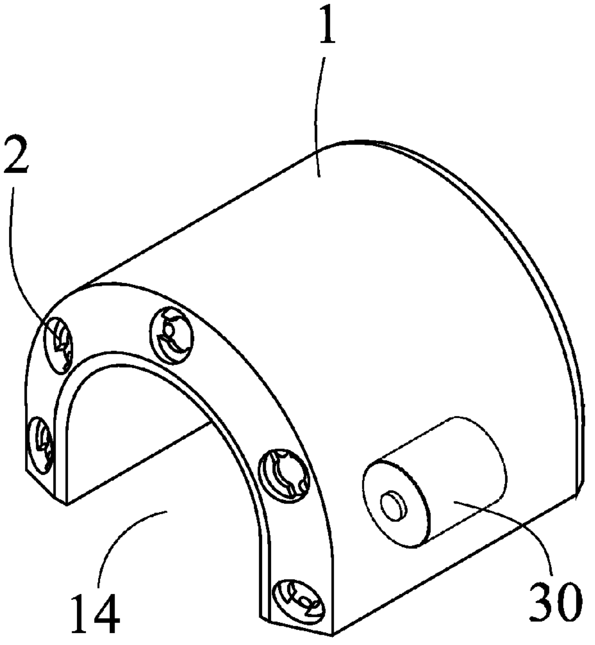
FIG. 6 is a three-dimensional view of a fire nozzle quick-assembly light according to a sixth embodiment of the present disclosure.

Please refer to FIG. 6, which is a three-dimensional view of a fire nozzle quick-assembly light according to a sixth embodiment of the present disclosure. As shown in FIG. 6, a fire nozzle quick-assembly light, adapted for mounting on a fire nozzle 0, is disclosed, which comprises: a frame 1, formed with a groove 14 for mounting the frame 1 onto the fire nozzle 0 by clamping; a luminous device 2, disposed on the frame 1; and an electricity storage device 30, disposed on the frame 1 and for providing power to the luminous device 2. In this embodiment, the electricity storage device 30 can be a battery pack. Accordingly, the fire nozzle quick-assembly light is mounted on the fire nozzle 0 by the groove 14 while being powered by the electricity storage device 30 for emitting light to a fire scene. Moreover, the frame 1 is made of a flexible material so that the frame 1 itself is flexible for facilitating the same to be clamped on the fire nozzle 0.

The fire nozzle quick-assembly light of the present disclosure, being tailor-made for meeting the need of firemen, can be mounted on or detached from fire nozzles easily and rapidly. Operationally, when additional lighting is required in a fire scene a fire scene and there is no worry about low water flow and pressure that is suitable to power the fire nozzle quick-assembly light using the generator 31, a fireman can connect the first end 11 to the joint of a fire nozzle and the second end 12 to a fire hose in a rapid manner since the first end 11 and the second end 12 of the quick-assembly light are rapid joints, and thus, enables a water flow of high water pressure to flow through the fire nozzle quick-assembly light for driving of the generator to produce power to the luminous device, so that the fireman is able to light up the fire scene so as to assist firemen in putting out blaze, hooking up hoses, evaluating fire scenes, etc., i.e. the overall firefight efficiency can be enhanced. However, while operating in a condition that there is problem with water flow and water pressure, instead of using the generator 31 for powering the fire nozzle quick-assembly light, the fire nozzle quick-assembly light can use the power stored in the electricity storage device 30 and thus there will be no loss to the water pressure and water flow of the fire nozzle. Moreover, in a condition when the firemen are able to function without the assistant of addition lighting as they are fighting a fire outdoors during day time, the fire nozzle quick-assembly light of the present disclosure can be detached from the fire nozzle rapidly and easily for releasing the burden of firemen when there is no need for additional illumination. Thereby, the present disclosure provides a fire nozzle quick-assembly light that is capable of providing high-brightness lighting to a fire scene for assisting firemen in putting out blaze, hooking up hoses, evaluating fire scenes, etc. while capable of being mounted on or detached from any firefighting equipment easily and rapidly depending on the evaluation of the firemen, by that the firemen are able to adapt to the volatile fire scene with high firefighting efficiency by responding with proper illumination and water source, while simultaneously not only ensuring the safety of himself/herself and his/her partners, but also capable of guiding any persons trapped in the fire scene to escape.

By the quick-detach design of the fire nozzle quick-assembly light disclosed in the present disclosure, the burden of the front-line firemen can be released for it can replace those conventional heavy and bulky spot light fixtures to be used for lighting up a fire scene when needed. Thereby, the firefight efficiency can be enhanced.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A fire nozzle quick-assembly light, adapted for connected to a fire nozzle and a fire hose, comprising:

a frame, configured with a via hole, a first end and a second end in a manner that the first and the second ends are disposed on the frame at positions opposite to each other for connecting respectively to the first nozzle and the first hose, while allowing the via hole to be formed boring through the frame from the first end to the second end;

a luminous device, disposed on the frame; and a hollow-shaft generator, disposed on the frame and for providing power to the luminous device;

wherein the hollow-shaft generator has an electricity storage device configured therein;

wherein the hollow shaft generator, having a blade element disposed inside the frame at position for allowing a fluid flowing inside the frame to flow therethrough so as to drive the blade element to rotate and thus cause the generator to produce electricity accordingly.

2. The fire nozzle quick-assembly light of claim 1, wherein the electricity storage device is substantially a battery pack.

3. The fire nozzle quick-assembly light of claim 1, wherein each of the first end and the second end is formed into a component selected from the group consisting of: a rapid joint and a screw joint.

4. The fire nozzle quick-assembly light of claim 1, wherein the frame is further configured with a handle.

5. The fire nozzle quick-assembly light of claim 1, wherein the luminous device is substantially a Light-emitting diode (LED).

6. A fire nozzle quick-assembly light, adapted for connected to a fire nozzle and a fire hose, comprising:

a frame, configured with a via hole, a first end and a second end in a manner that the first and the second ends are disposed on the frame at positions opposite to each other for connecting respectively to the first nozzle and the first hose, while allowing the via hole to be formed boring through the frame from the first end to the second end;

a luminous device, disposed on the frame; and a hollow-shaft generator, disposed on the frame and for providing power to the luminous device, comprising a blade element disposed inside the frame at position for allowing a fluid flowing inside the frame to flow therethrough so as to drive the blade element to rotate and thus cause the generator to produce electricity accordingly.

7. The fire nozzle quick-assembly light of claim 6, wherein the hollow-shaft generator has an electricity storage device configured therein.

8. The fire nozzle quick-assembly light of claim 7, wherein the electricity storage device is substantially a battery pack.

9. The fire nozzle quick-assembly light of claim 6, wherein each of the first end and the second end is formed into a component selected from the group consisting of: a rapid joint and a screw joint.

10. The fire nozzle quick-assembly light of claim 6, wherein the frame is further configured with a handle.

11. The fire nozzle quick-assembly light of claim 6, wherein the luminous device is substantially a Light-emitting diode (LED).

* * * * *